US007725834B2

(12) United States Patent  
Bell et al.

(10) Patent No.: US 7,725,834 B2
(45) Date of Patent: May 25, 2010

(54) DESIGNER-CREATED ASPECT FOR AN ELECTRONIC FORM TEMPLATE

(75) Inventors: Joshua S. Bell, Kirkland, WA (US); Scott M. Roberts, Bothell, WA (US); Jun Jin, Bellevue, WA (US); Brian C. Teutsch, Seattle, WA (US); Laurent Mollicone, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 11/072,087

(22) Filed: Mar. 4, 2005

(65) Prior Publication Data

US 2006/0197982 A1    Sep. 7, 2006

(51) Int. Cl.
G06F 3/048 (2006.01)
G06F 17/00 (2006.01)

(52) U.S. Cl. .................. 715/764; 715/234; 715/235

(58) Field of Classification Search ............... 715/764, 715/513, 234, 235
See application file for complete search history.

(56) References Cited

U.S. PATENT DOCUMENTS

| 4,201,978 | A | 5/1980 | Nally |
| 4,498,147 | A | 2/1985 | Agnew et al. |
| 4,514,800 | A | 4/1985 | Gruner et al. |
| 4,564,752 | A | 1/1986 | Lepic et al. |
| 4,641,274 | A | 2/1987 | Swank |
| 4,674,040 | A | 6/1987 | Barker et al. |
| 4,723,211 | A | 2/1988 | Barker et al. |
| 4,739,477 | A | 4/1988 | Barker et al. |
| 4,815,029 | A | 3/1989 | Barker et al. |
| 4,847,749 | A | 7/1989 | Collins et al. |
| 4,910,663 | A | 3/1990 | Bailey |
| 4,926,476 | A | 5/1990 | Covey |
| 4,933,880 | A | 6/1990 | Borgendale et al. |
| 4,962,475 | A | 10/1990 | Hernandez et al. |
| 5,025,484 | A | 6/1991 | Yamanari et al. |
| 5,072,412 | A | 12/1991 | Henderson, Jr. et al. |
| 5,140,563 | A | 8/1992 | Thinesen |
| 5,179,703 | A | 1/1993 | Evans |
| 5,182,709 | A | 1/1993 | Makus |

(Continued)

FOREIGN PATENT DOCUMENTS

EP    0841615    11/1999

(Continued)

OTHER PUBLICATIONS

"Architecture for a Dynamic Information Area Control" IBM Technical Disclosure Bulletin IBM Corp. New York US vol. 37 No. 10 Jan. 10, 1994. pp. 245-246.

(Continued)

*Primary Examiner*—William L Bashore
*Assistant Examiner*—David Phantana-angkool

(57) ABSTRACT

Systems and/or methods that enable addition of a designer-created aspect originating from one electronic form template into another electronic form template are described. The systems and/or methods may also, in one embodiment, enable a user to graphically package designer-created aspects of an existing electronic form template into a component capable of being added to another electronic form template. In another embodiment, these systems and/or methods may enable mapping of an existing non-structural designer-created aspect originating from one electronic form template onto a data structure of another electronic form template.

17 Claims, 9 Drawing Sheets

U.S. PATENT DOCUMENTS

| | | |
|---|---|---|
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A * | 9/1999 | Glaser ........................ 715/234 |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |

| | | | |
|---|---|---|---|
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu |
| 6,463,419 B1 | 10/2002 | Kluss |
| 6,470,349 B1 | 10/2002 | Heninger |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky |
| 6,480,860 B1 | 11/2002 | Monday |
| 6,487,566 B1 | 11/2002 | Sundaresan |
| 6,490,601 B1 | 12/2002 | Markus et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,507,856 B1 | 1/2003 | Chen et al. |

| | | |
|---|---|---|
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin |
| 6,748,569 B1 | 6/2004 | Brooke et al. |
| 6,751,777 B2 | 6/2004 | Bates |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abrari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 * | 5/2006 | Knauss et al. ............... 715/236 |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 * | 7/2006 | Davis et al. ................. 715/205 |
| 7,080,083 B2 * | 7/2006 | Kim et al. ................... 707/100 |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |

| | | | | | | |
|---|---|---|---|---|---|---|
| 7,107,282 B1 | 9/2006 | Yalamanchi | | 2002/0023113 A1 | 2/2002 | Hsing et al. |
| 7,107,521 B2 | 9/2006 | Santos | | 2002/0026441 A1* | 2/2002 | Kutay et al. ............ 707/5 |
| 7,107,539 B2 | 9/2006 | Abbott et al. | | 2002/0026461 A1 | 2/2002 | Kutay et al. |
| 7,120,863 B1 | 10/2006 | Wang | | 2002/0032590 A1 | 3/2002 | Anand et al. |
| 7,124,167 B1 | 10/2006 | Bellotti et al. | | 2002/0032692 A1 | 3/2002 | Suzuki et al. |
| 7,130,885 B2 | 10/2006 | Chandra et al. | | 2002/0032706 A1 | 3/2002 | Perla et al. |
| 7,143,341 B1 | 11/2006 | Kohli | | 2002/0032768 A1 | 3/2002 | Voskuil |
| 7,146,564 B2* | 12/2006 | Kim et al. ............ 715/235 | | 2002/0035579 A1 | 3/2002 | Wang et al. |
| 7,152,205 B2 | 12/2006 | Day et al. | | 2002/0035581 A1 | 3/2002 | Reynar et al. |
| 7,159,011 B1 | 1/2007 | Knight et al. | | 2002/0040469 A1 | 4/2002 | Pramberger |
| 7,168,035 B1* | 1/2007 | Bell et al. ............ 715/234 | | 2002/0052769 A1 | 5/2002 | Navani et al. |
| 7,178,166 B1 | 2/2007 | Taylor et al. | | 2002/0053021 A1 | 5/2002 | Rice et al. |
| 7,190,376 B1 | 3/2007 | Tonisson | | 2002/0054126 A1 | 5/2002 | Gamon |
| 7,191,394 B1 | 3/2007 | Ardeleanu et al. | | 2002/0057297 A1 | 5/2002 | Grimes et al. |
| 7,200,665 B2 | 4/2007 | Eshghi et al. | | 2002/0065798 A1 | 5/2002 | Bostleman et al. |
| 7,200,816 B2* | 4/2007 | Falk et al. ............ 715/762 | | 2002/0065847 A1 | 5/2002 | Furukawa et al. |
| 7,213,200 B2 | 5/2007 | Abe et al. | | 2002/0070973 A1 | 6/2002 | Croley |
| 7,236,982 B2* | 6/2007 | Zlatanov et al. ............ 707/102 | | 2002/0078074 A1 | 6/2002 | Cho et al. |
| 7,237,114 B1 | 6/2007 | Rosenberg | | 2002/0078103 A1 | 6/2002 | Gorman et al. |
| 7,249,328 B1* | 7/2007 | Davis ............ 715/853 | | 2002/0083145 A1 | 6/2002 | Perinpanathan |
| 7,272,789 B2 | 9/2007 | O'Brien | | 2002/0083148 A1 | 6/2002 | Shaw et al. |
| 7,281,018 B1 | 10/2007 | Begun et al. | | 2002/0083318 A1 | 6/2002 | Larose |
| 7,281,206 B2 | 10/2007 | Schnelle et al. | | 2002/0091738 A1 | 7/2002 | Rohrabaugh et al. |
| 7,281,245 B2 | 10/2007 | Reynar et al. | | 2002/0099952 A1 | 7/2002 | Lambert et al. |
| 7,284,208 B2* | 10/2007 | Matthews ............ 715/854 | | 2002/0100027 A1 | 7/2002 | Binding et al. |
| 7,287,218 B1* | 10/2007 | Knotz et al. ............ 715/209 | | 2002/0107885 A1 | 8/2002 | Brooks et al. |
| 7,296,017 B2 | 11/2007 | Larcheveque et al. | | 2002/0111699 A1 | 8/2002 | Melli et al. |
| 7,313,758 B2* | 12/2007 | Kozlov ............ 715/234 | | 2002/0111932 A1 | 8/2002 | Roberge et al. |
| 7,316,003 B1* | 1/2008 | Dulepet et al. ............ 717/111 | | 2002/0112224 A1 | 8/2002 | Cox |
| 7,318,237 B2* | 1/2008 | Moriconi et al. ............ 726/27 | | 2002/0129056 A1 | 9/2002 | Conant et al. |
| 7,334,178 B1 | 2/2008 | Stanciu et al. | | 2002/0133484 A1 | 9/2002 | Chau et al. |
| 7,337,391 B2* | 2/2008 | Clarke et al. ............ 715/234 | | 2002/0152222 A1 | 10/2002 | Holbrook |
| 7,337,392 B2 | 2/2008 | Lue | | 2002/0152244 A1* | 10/2002 | Dean et al. ............ 707/530 |
| 7,346,610 B2 | 3/2008 | Ruthfield et al. | | 2002/0156772 A1 | 10/2002 | Chau et al. |
| 7,346,840 B1* | 3/2008 | Ravishankar et al. ....... 715/234 | | 2002/0156846 A1 | 10/2002 | Rawat et al. |
| 7,346,848 B1 | 3/2008 | Ruthfield et al. | | 2002/0156929 A1 | 10/2002 | Hekmatpour |
| 7,350,141 B2 | 3/2008 | Kotler et al. | | 2002/0169752 A1 | 11/2002 | Kusama et al. |
| 7,370,066 B1 | 5/2008 | Sikchi et al. | | 2002/0169789 A1 | 11/2002 | Kutay et al. |
| 7,373,595 B2 | 5/2008 | Jones et al. | | 2002/0174147 A1 | 11/2002 | Wang et al. |
| 7,376,673 B1 | 5/2008 | Chalecki et al. | | 2002/0174417 A1 | 11/2002 | Sijacic et al. |
| 7,412,649 B2* | 8/2008 | Emek et al. ............ 715/235 | | 2002/0178187 A1 | 11/2002 | Rasmussen et al. |
| 7,424,671 B2* | 9/2008 | Elza et al. ............ 715/234 | | 2002/0178380 A1 | 11/2002 | Wolf et al. |
| 7,428,699 B1* | 9/2008 | Kane et al. ............ 715/236 | | 2002/0184188 A1 | 12/2002 | Mandyam et al. |
| 7,441,200 B2 | 10/2008 | Savage | | 2002/0184219 A1 | 12/2002 | Preisig et al. |
| 7,490,109 B1 | 2/2009 | Sikchi et al. | | 2002/0184485 A1 | 12/2002 | Dray et al. |
| 7,496,632 B2 | 2/2009 | Chapman et al. | | 2002/0188597 A1 | 12/2002 | Kern et al. |
| 7,496,837 B1 | 2/2009 | Larcheveque et al. | | 2002/0188613 A1 | 12/2002 | Chakraborty et al. |
| 7,543,228 B2 | 6/2009 | Kelkar | | 2002/0194219 A1 | 12/2002 | Bradley et al. |
| 7,549,115 B2 | 6/2009 | Kotler | | 2002/0196281 A1 | 12/2002 | Audleman et al. |
| 7,584,417 B2 | 9/2009 | Friend | | 2002/0196288 A1 | 12/2002 | Emrani |
| 7,613,996 B2 | 11/2009 | Dallett et al. | | 2002/0198891 A1 | 12/2002 | Li et al. |
| 7,673,227 B2 | 3/2010 | Kotler | | 2002/0198935 A1 | 12/2002 | Crandall, Sr. et al. |
| 7,673,228 B2 | 3/2010 | Kelkar | | 2003/0004951 A1 | 1/2003 | Chokshi |
| 7,676,843 B1 | 3/2010 | Stott | | 2003/0007000 A1 | 1/2003 | Carlson et al. |
| 7,689,929 B2 | 3/2010 | Ruthfield | | 2003/0014397 A1 | 1/2003 | Chau et al. |
| 7,692,636 B2 | 4/2010 | Kim | | 2003/0018668 A1 | 1/2003 | Britton et al. |
| 2001/0007109 A1 | 7/2001 | Lange | | 2003/0020746 A1 | 1/2003 | Chen et al. |
| 2001/0016880 A1 | 8/2001 | Cai et al. | | 2003/0023641 A1 | 1/2003 | Gorman et al. |
| 2001/0022592 A1 | 9/2001 | Alimpich et al. | | 2003/0025732 A1 | 2/2003 | Prichard |
| 2001/0024195 A1 | 9/2001 | Hayakawa | | 2003/0026507 A1 | 2/2003 | Zlotnick |
| 2001/0037345 A1 | 11/2001 | Kiernan et al. | | 2003/0028550 A1 | 2/2003 | Lee et al. |
| 2001/0044850 A1 | 11/2001 | Raz et al. | | 2003/0037303 A1 | 2/2003 | Bodlaender |
| 2001/0051928 A1 | 12/2001 | Brody | | 2003/0038788 A1 | 2/2003 | Demartines et al. |
| 2001/0054004 A1 | 12/2001 | Powers | | 2003/0038846 A1 | 2/2003 | Hori et al. |
| 2001/0056411 A1 | 12/2001 | Lindskog et al. | | 2003/0043986 A1 | 3/2003 | Creamer |
| 2001/0056429 A1 | 12/2001 | Moore et al. | | 2003/0046665 A1 | 3/2003 | Ilin |
| 2001/0056460 A1 | 12/2001 | Sahota et al. | | 2003/0048301 A1 | 3/2003 | Menninger |
| 2002/0010700 A1 | 1/2002 | Wotring | | 2003/0051243 A1 | 3/2003 | Lemmons et al. |
| 2002/0010743 A1 | 1/2002 | Ryan et al. | | 2003/0055811 A1 | 3/2003 | Stork et al. |
| 2002/0010746 A1 | 1/2002 | Jilk, Jr. et al. | | 2003/0055828 A1 | 3/2003 | Koch et al. |
| 2002/0010855 A1 | 1/2002 | Reshef et al. | | 2003/0056198 A1 | 3/2003 | Al-Azzawe |
| 2002/0013788 A1 | 1/2002 | Pennell et al. | | 2003/0061386 A1 | 3/2003 | Brown |
| 2002/0019941 A1 | 2/2002 | Chan et al. | | 2003/0061567 A1 | 3/2003 | Brown et al. |

| | | | | | | |
|---|---|---|---|---|---|---|
| 2003/0084424 A1 | 5/2003 | Reddy et al. | | 2004/0117769 A1 | 6/2004 | Lauzon |
| 2003/0093755 A1 | 5/2003 | O'Carroll | | 2004/0123277 A1 | 6/2004 | Schrader et al. |
| 2003/0110443 A1 | 6/2003 | Yankovich et al. | | 2004/0139400 A1 | 7/2004 | Allam et al. |
| 2003/0120578 A1 | 6/2003 | Newman | | 2004/0146199 A1 | 7/2004 | Berkner et al. |
| 2003/0120651 A1 | 6/2003 | Bernstein et al. | | 2004/0148178 A1 | 7/2004 | Brain |
| 2003/0120659 A1 | 6/2003 | Sridhar | | 2004/0148514 A1 | 7/2004 | Fee et al. |
| 2003/0120671 A1 | 6/2003 | Kim et al. | | 2004/0148571 A1 | 7/2004 | Lue |
| 2003/0120686 A1 | 6/2003 | Kim et al. | | 2004/0162741 A1 | 8/2004 | Flaxer et al. |
| 2003/0126555 A1 | 7/2003 | Aggarwal et al. | | 2004/0163041 A1 | 8/2004 | Engel |
| 2003/0128196 A1 | 7/2003 | Lapstun et al. | | 2004/0163046 A1 | 8/2004 | Chu et al. |
| 2003/0135825 A1 | 7/2003 | Gertner et al. | | 2004/0172442 A1 | 9/2004 | Ripley |
| 2003/0140132 A1 | 7/2003 | Champagne | | 2004/0181543 A1 | 9/2004 | Wu et al. |
| 2003/0140160 A1 | 7/2003 | Raz et al. | | 2004/0181711 A1 | 9/2004 | Johnson et al. |
| 2003/0142072 A1 | 7/2003 | Lapstun et al. | | 2004/0186762 A1 | 9/2004 | Beaven et al. |
| 2003/0149934 A1 | 8/2003 | Worden | | 2004/0189708 A1 | 9/2004 | Larcheveque et al. |
| 2003/0158897 A1 | 8/2003 | Ben-Natan et al. | | 2004/0189716 A1 | 9/2004 | Paoli et al. |
| 2003/0163285 A1 | 8/2003 | Nakamura et al. | | 2004/0194035 A1 | 9/2004 | Chakraborty |
| 2003/0167277 A1 | 9/2003 | Hejlsberg et al. | | 2004/0199572 A1 | 10/2004 | Hunt et al. |
| 2003/0172113 A1 | 9/2003 | Cameron et al. | | 2004/0205473 A1 | 10/2004 | Fisher et al. |
| 2003/0182268 A1 | 9/2003 | Lal | | 2004/0205525 A1 | 10/2004 | Murren et al. |
| 2003/0182327 A1 | 9/2003 | Ramanujam et al. | | 2004/0205534 A1 | 10/2004 | Koelle |
| 2003/0187756 A1 | 10/2003 | Klivington et al. | | 2004/0205571 A1 | 10/2004 | Adler et al. |
| 2003/0187930 A1 | 10/2003 | Ghaffar et al. | | 2004/0205592 A1 | 10/2004 | Huang |
| 2003/0188260 A1 | 10/2003 | Jensen et al. | | 2004/0205605 A1 | 10/2004 | Adler et al. |
| 2003/0189593 A1 | 10/2003 | Yarvin | | 2004/0205653 A1 | 10/2004 | Hadfield et al. |
| 2003/0192008 A1 | 10/2003 | Lee | | 2004/0205671 A1 | 10/2004 | Sukehiro et al. |
| 2003/0200506 A1 | 10/2003 | Abe et al. | | 2004/0210599 A1 | 10/2004 | Friedman et al. |
| 2003/0204481 A1 | 10/2003 | Lau | | 2004/0210645 A1 | 10/2004 | Kouznetsov et al. |
| 2003/0204511 A1 | 10/2003 | Brundage | | 2004/0216084 A1 | 10/2004 | Brown et al. |
| 2003/0204814 A1 | 10/2003 | Elo et al. | | 2004/0221238 A1 | 11/2004 | Cifra et al. |
| 2003/0205615 A1 | 11/2003 | Marappan | | 2004/0221245 A1 | 11/2004 | Chickles et al. |
| 2003/0210428 A1 | 11/2003 | Bevlin et al. | | 2004/0237030 A1 | 11/2004 | Malkin |
| 2003/0212664 A1 | 11/2003 | Breining et al. | | 2004/0260593 A1 | 12/2004 | Abraham-Fuchs et al. |
| 2003/0212902 A1 | 11/2003 | van der Made | | 2004/0261019 A1 | 12/2004 | Imamura et al. |
| 2003/0217053 A1 | 11/2003 | Bachman et al. | | 2004/0268229 A1 | 12/2004 | Paoli et al. |
| 2003/0218620 A1 | 11/2003 | Lai et al. | | 2005/0004893 A1 | 1/2005 | Sangroniz |
| 2003/0220930 A1 | 11/2003 | Milleker et al. | | 2005/0005248 A1 | 1/2005 | Rockey et al. |
| 2003/0225469 A1 | 12/2003 | DeRemer et al. | | 2005/0015279 A1 | 1/2005 | Rucker |
| 2003/0225768 A1 | 12/2003 | Chaudhuri | | 2005/0015732 A1 | 1/2005 | Vedula et al. |
| 2003/0225829 A1 | 12/2003 | Pena et al. | | 2005/0022115 A1 | 1/2005 | Baumgartner et al. |
| 2003/0226132 A1 | 12/2003 | Tondreau et al. | | 2005/0027757 A1 | 2/2005 | Kiessig et al. |
| 2003/0233374 A1 | 12/2003 | Spinola et al. | | 2005/0028073 A1 | 2/2005 | Henry et al. |
| 2003/0233644 A1 | 12/2003 | Cohen et al. | | 2005/0033626 A1 | 2/2005 | Kruse et al. |
| 2003/0236859 A1 | 12/2003 | Vaschillo et al. | | 2005/0033728 A1 | 2/2005 | James |
| 2003/0236903 A1 | 12/2003 | Piotrowski | | 2005/0038711 A1 | 2/2005 | Marlelo |
| 2003/0237046 A1 | 12/2003 | Parker | | 2005/0050066 A1 | 3/2005 | Hughes |
| 2003/0237047 A1 | 12/2003 | Borson | | 2005/0055627 A1 | 3/2005 | Lloyd et al. |
| 2004/0002939 A1 | 1/2004 | Arora | | 2005/0060324 A1 | 3/2005 | Johnson et al. |
| 2004/0002950 A1 | 1/2004 | Brennan et al. | | 2005/0060647 A1 | 3/2005 | Doan et al. |
| 2004/0003031 A1 | 1/2004 | Brown et al. | | 2005/0060721 A1 | 3/2005 | Choudhary et al. |
| 2004/0003353 A1 | 1/2004 | Rivera et al. | | 2005/0065933 A1 | 3/2005 | Goering |
| 2004/0003389 A1 | 1/2004 | Reynar et al. | | 2005/0065936 A1 | 3/2005 | Goering |
| 2004/0006744 A1 | 1/2004 | Jones et al. | | 2005/0066287 A1 | 3/2005 | Tattrie et al. |
| 2004/0010752 A1 | 1/2004 | Chan et al. | | 2005/0071752 A1 | 3/2005 | Marlatt |
| 2004/0015783 A1 | 1/2004 | Lennon et al. | | 2005/0076049 A1 | 4/2005 | Qubti et al. |
| 2004/0024842 A1 | 2/2004 | Witt | | 2005/0080801 A1 | 4/2005 | Kothandaraman et al. |
| 2004/0030991 A1 | 2/2004 | Hepworth et al. | | 2005/0091285 A1 | 4/2005 | Krishnan et al. |
| 2004/0039881 A1 | 2/2004 | Shoebridge et al. | | 2005/0091305 A1 | 4/2005 | Lange et al. |
| 2004/0039990 A1 | 2/2004 | Bakar et al. | | 2005/0097536 A1* | 5/2005 | Bernstein et al. ............ 717/156 |
| 2004/0039993 A1 | 2/2004 | Kougiouris et al. | | 2005/0102370 A1 | 5/2005 | Lin et al. |
| 2004/0044961 A1 | 3/2004 | Pesenson | | 2005/0102612 A1 | 5/2005 | Allan et al. |
| 2004/0044965 A1 | 3/2004 | Toyama et al. | | 2005/0108104 A1 | 5/2005 | Woo |
| 2004/0046789 A1 | 3/2004 | Inanoria | | 2005/0108624 A1 | 5/2005 | Carrier |
| 2004/0054966 A1 | 3/2004 | Busch et al. | | 2005/0114757 A1 | 5/2005 | Sahota et al. |
| 2004/0059754 A1 | 3/2004 | Barghout et al. | | 2005/0114764 A1 | 5/2005 | Gudenkauf et al. |
| 2004/0073565 A1 | 4/2004 | Kaufman et al. | | 2005/0132043 A1 | 6/2005 | Wang et al. |
| 2004/0073868 A1 | 4/2004 | Easter et al. | | 2005/0132196 A1 | 6/2005 | Dietl |
| 2004/0078756 A1 | 4/2004 | Napper et al. | | 2005/0138031 A1* | 6/2005 | Wefers ......................... 707/9 |
| 2004/0083426 A1 | 4/2004 | Sahu | | 2005/0138086 A1 | 6/2005 | Pecht-Seibert |
| 2004/0088647 A1 | 5/2004 | Miller et al. | | 2005/0138539 A1 | 6/2005 | Bravery et al. |
| 2004/0088652 A1 | 5/2004 | Abe et al. | | 2005/0149375 A1 | 7/2005 | Wefers |
| 2004/0093596 A1 | 5/2004 | Koyano | | 2005/0149726 A1 | 7/2005 | Joshi et al. |
| 2004/0107367 A1 | 6/2004 | Kisters | | 2005/0160398 A1 | 7/2005 | Bjornson et al. |

| | | |
|---|---|---|
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0246304 A1 | 11/2005 | Knight et al. |
| 2005/0257148 A1 | 11/2005 | Goodman et al. |
| 2005/0262112 A1* | 11/2005 | Moore .................. 707/100 |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026500 A1 | 2/2006 | Qa 'Im-maqami' |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0075245 A1 | 4/2006 | Meier |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1 | 6/2006 | Catorcini et al. |
| 2006/0129978 A1 | 6/2006 | Abrari et al. |
| 2006/0136422 A1 | 6/2006 | Matveief et al. |
| 2006/0143220 A1 | 6/2006 | Spencer |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0230363 A1* | 10/2006 | Rapp .................. 715/853 |
| 2006/0248468 A1 | 11/2006 | Constantine et al. |
| 2007/0005611 A1 | 1/2007 | Takasugi et al. |
| 2007/0036433 A1 | 2/2007 | Teutsch et al. |
| 2007/0050719 A1 | 3/2007 | Lui et al. |
| 2007/0061467 A1 | 3/2007 | Essey et al. |
| 2007/0061706 A1 | 3/2007 | Cupala |
| 2007/0074106 A1 | 3/2007 | Ardeleanu et al. |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | Mackay et al. |
| 2007/0208769 A1 | 9/2007 | Boehm et al. |
| 2007/0276768 A1 | 11/2007 | Pallante |
| 2008/0021916 A1 | 1/2008 | Schnelle et al. |
| 2008/0028340 A1 | 1/2008 | Davis |
| 2008/0126402 A1 | 5/2008 | Sikchi et al. |
| 2008/0134162 A1 | 6/2008 | James |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 4225466 | 8/1992 |
| JP | 5314152 | 10/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 8/2001 |

OTHER PUBLICATIONS

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Laura Acklen & Read Gilgen, "Using corel Wordperfect 9", 251-284, 424-434, 583-586 (1998).

Leblond et al, "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Excel 97 for Busy People Published by Osborne/Mcgraw-Hill 1997 pp. 48-50.

Rapaport L; "Get more from SharePoint" Transform Magazine vol. 11 No. 3. Mar. 2002 pp. 1315.

Musgrave S; "Networking technology—impact and opportunities" Survey and Statistical Computing 1996. Proceedings of theSecond ASC International Conference. Sep. 1996. pp. 369-378. London UK.

McCright J.S.; "New Tool Kit to Link Groove with Microsoft Sharepoint" eWeek Enterprise News & Reviews Ziff Davis Media Inc. Jul. 29, 2002.

Description of Whitehill Composer software product producted by Whitehill Technologies Inc. available at <http://www.xml.com/pub/p/221> accessed on Apr. 8, 2004, two pages.

Clark James—W3C Editor; "XSL Transformation (XSLT) Verison 1.0" Nov. 16, 1999 W3C (MIT INRIA Kejo) pp. 1-156.

Object Management Group, XML Metadata Interchange (XMI) Specification Version 1.2 Jan. 2002.

W3C Editor James Clark and Ste; "XML Path Language (XPath) Version 1.0" Nov. 16, 1999 W3C (MIT INRIA Kejo) pp. 1-49.

Staneck W., "Internal and External Media" Electronic Publishing Unleashed, 1995, Chapter 22, pp. 510-542.

Pike et al., "The Use of Name Spaces in Plan 9," Operating Systems Review vol. 27, No. 2, Apr. 1993, pp. 72-76.

Pike et al., "Plan 9 from Bell Labs" UKUUG, Summer 1990, 10 pages.

Peterson B., "Unix Variants," Unix Review, vol. 10, No. 4, Apr. 1992, pp. 29-31.

Kobayashi et al., "An Update on BTRON-specification OS Development" IEEE 1991, pp. 132-140.

Herzner et al., "CDAM- Compound Document Access and Management. An Object-Oriented Approach" Multimedia Systems Interaction and Applications, 1992, Chapter 3, pp. 17-36.

DiLascia et al., "Sweeper" Microsoft Interactive Developer, vol. 1, No. 1, 1996, 27 pages.

Clapp D., "The NeXT Application Kit Part I: Non-Responsive Classes," The NeXT Bible 1990, Chapter 16, pp. 275-293.

Berg A., "Naming and Binding: Monikers" Inside OLE, 1995, Chapter 9, pp. 431-490.

Barker et al., "Creating In-Line Objects Within An Integrated Editing Environment," IBM Technical Disclosure Bulletin, vol. 27, No. 5, Oct. 1984, p. 2962.

"Store and Organize Related Project Files in a Binder," Getting Results with Microsoft Office, 1990, pp. 109-112.

Zdonik S., "Object Management System Concepts," ACM, 1984, pp. 13-19.

Trupin J., "The Visual Programmer," Microsdft Systems Journal, Apr. 1996, pp. 103-105.

Schmid et al., "Protecting Data from Malicious Software"; 18th Annual Computer Security Applications Conference; 2002; pp. 199-208.

Prevelakis et al., "Sandboxing Applications"; Proceedings of the FREENIX Track; 2001; pp. 119-126.

Sun Q. et al., "A robust and secure media signature scheme for JPEG images" Proceedings of 2002 IEEE Workshop on Multimedia Signal Processing, Dec. 2002, pp. 296-299.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

"A tour of Xmetal" O'Reilly XML.COM 'Online Jul. 14, 1999 XP002230081.retrieved from the internet: <URL:http://www.xml.com/pub/a/SeyboldReport/ip0311025.html> retrieved on Feb. 5, 2003.

"Netscape Communicator's Collapsible Toolbars" CHI'98 Human Factors in Computing Systems Conference Proceedings Los Angeles CA Apr. 18-23, 1998 pp. 81-86.

"Flexible Information Presentation with XML" 1998 The Institution of Electrical Engineers 6 pages.

"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

"XKvalidator: A Constraint Validator for XML" CIKM '-2 Nov. 4-9, 2002 Copyright 2002 ACM 1-58113-492-4/02/0011 pp. 446-452.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"Storing and Querying Multiversion XML Documents using Durable Node Numbers" IEEE 2002 pp. 232-241.

"XML Document Versioning" SIGMOD Record vol. 30 No. 3 Sep. 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering Vo.1. 11 No. 4 Jul./Aug. 1999. pp. 629-938.

"From small beginnings" Knowledge Management Nov. 2001 pp. 28-30.

"XML Editors: Allegations of Functionality in search of reality" Internet 'Online! 1999 XP002230082 retrieved from the Internet <URL:http://www.ivritype.corn/xml/>.

"Photo Shop 5/5.5 Wow! Book" 2000 Peachpit Press pp. 8-17.

"XML Spy Tops as XML Editor" http://www.eweek.com/article2/0395972404100.asp Nov. 25, 2002 4 pages.

"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

"Tsbiff—tildeslash biff—version 1.2.1" Internet Document [Online]Jun. 1999 URL: http://web.archive.org/web/19990912001527/http://www.tildeslash.com/tsbiff/.

"Micro-Firewalls for Dynamic Network Security with Distributed Intrusion Detection"; IEEE INternational Symposium on Network Computing and Applications; 2001; pp. 68-79.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

"Delphi 5 Developer's Guide" Sams Publishing 1999 Chapter 31 Section: Data Streaming 6 pages.

"Validating MPEG-21. Encapsulated Functional Metadata" IEEE 2002 pp. 209-212.

"XFIG Version 3.2 Patchlevel 2 (Jul. 2, 1998) Users Manual (Edition 1.0)" Internet Document [Online] Jul. 2, 1998 XP002229137 Retrieved from the Internet: <URL: http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Altova et al. XML Spy, XML integrated Development Environments, Altova Inc., 2002, pp. 1-18.

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Altova, "User Reference Manual Version 4.4, XML spy suite 4.4," Atova Ges.m.b.H & Altova, Inc., May 24, 2002, pages cover, Copyright p. 1-565.

Altova, Inc., "XML Spy 4.0 Manual," Altova Inc. & Altova GmbH, coyright 1998-2001, Chapters 1, 2, and 6, encompassing pp. 1-17, 18-90, and 343-382.

Cybook, Inc.: "Copying the Search Form to Services-based Web Sites" INternet Article, (online) Jul. 26, 2004.

Excel Developer Tip (hereinafter "Excel"), "Determining the Data Type of a Cell", May 13, 1998, p. 1 (available at http://jwalk.com/ss//excel/tips/tip62.htm).

Macromedia, Inc.: "Dreamweaver Technote, Changes in copying and pasting in Dreamweaver 4" Internet Article (online).

Rado, Dave: "How to create a template that makes it easy for users to "fill in the blanks", without doing any programming" Microsoft Word MVP FAQ Site, (online) Apr. 30, 2004.

Microsoft Corporation, "Microsoft Computer Dictionary" Microsoft Press, Fifth Edition, p. 149.

Borland, Russo "Running Microsoft Word 97", 314-315, 338, 361-362, 390, and 714-719.

"Microsoft Word 2000", Screenshots,(1999),1-5.

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Singh, Darshan "Microsoft InfoPath 2003 by Example", Retrieved from the Internet at http://www.perfectxml.com/InfoPath.asp on Jan. 21, 2007,(Apr. 20, 2003).

Raman, T. V., et al., "XForms 1.0", (Dec. 2001),Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Brabrand, et al., "Power Forms Declarative Client-side Form Field Validation", (2002),1-20.

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation" http://www2002.org/CDROM/refereed/321, Printed on May 18, 2007,(May 2002),25 pages.

Altova, et al., "User and Reference Manual Version 4.4", www.xmlspy.com, (May 24, 2007),1-565.

"XForm 1.0", W3C,(Jul. 16, 2001).

"Microsoft Word 2000 Screenshots", (2000),11-17.

XMLSPY, "XmlSpy 2004 Enterprise Edition Manual", Altova,(May 17, 2004),1-25, 220-225.

Stylusstudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Grosso, et al., "XML Fragment Interchange", W3C,(Feb. 2001),1-28.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vnWebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Ben-Natan, U.S. Appl. No. 60/203,081, filed May 9, 2000, entitled "Internet platform for creating and supporting communities".

Kutay, U.S. Appl. No. 60/209,713 filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662 filed Mar. 23, 2000, entitled "Collection-based presistent digital archives".

Pacheco, Xavier et al., "Delphi 5 Developers Guide", Sams Publishing. Chapter 31, Section: Data Streaming,(1999),4.

Hu, et al., "A Programmable Editor for Developing Structured Documents based on Bidirectional Transformations", ACM,(Aug. 2004),178-179.

Bradley, Neil "The XML Companion, Third Edition", *Published by Addison Wesley Professional*, http://proquestsafaribooksonline.com0201770598, http,(Dec. 12, 2001),1-18.

Klarlund, Nils "DSD: A Schema Language for XML", *ACM, FSMP Portland Oregon*, (2000),101-111.

Watt, Andrew "Microsoft Office Infopath 2003 Kick Starr", *(Published by Sams) Print ISBN-10:0-672-32623-X*, (Mar. 24, 2004),1-57.

Bray, Tim "Extensible Markup Language (XML)", http://wwvv.textualitv.com/sgml-erb/WD-xml.html, second named inventor Jean Paoli, third named inventor C.M. Sperberg-McQueen,(Feb. 10, 1998),37 Pages.

Kay, Michael "XSL Transfornmations (XSLT) Version 2.0", http://www.w3.org/Tr/2005M/D-xsIt20-20050404 (04/205),1-374.

"Non-Final Office Action", U.S. Appl. No. 11/227,550, (Aug. 3, 2009),10 pages.

"Notice of Allowance", U.S. Appl. No. 11/203,937, (Aug. 3, 2009),7 pages.

"Foreign Office Action", Application Serial No. 200610051554.X, (Jul. 10, 2009),11 pages.

"Non-Final Office Action", U.S. Appl. No. 11/234,767, (Aug. 12, 2009),24 Pages.

"Final Office Action", U.S. Appl. No. 10/977,198, (Aug. 19, 2009),15 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.

"Final Office Action", U.S. Appl. No. 10/402,640, (Aug. 28, 2009),17 pages.

"Notice of Allowance", U.S. Appl. No. 11/203,937, Supplemental,(Sep. 15, 2009),2 pages.

"Final Office Action", U.S. Appl. No. 10/942,528, (Sep. 17, 2009),27 pages.

"Non-Final Office Action", U.S. Appl. No. 11/107,347, (Sep. 17, 2009),9 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.

"Notice of Allowance", U.S. Appl. No. 11/203,937, (Aug. 31, 2009),2 pages.

"Non-Final Office Action", U.S. Appl. No. 11/567,149, (Sep. 8, 2009),5 pages.

"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

"Non-Final Office Action", U.S. Appl. No. 10/976,451, (Oct. 29, 2009),14 pages.

Webopedia, "Definition of OLE", Retrieved from: <http://www.webopedia.com/TERM/O/OLE.html>, (May 16, 1998, 3 pages.
Webopedia, "Definition of OpenDoc", Retrieved from: <http://wvvw.webopedia.com/TERM/O/OpenDoc.html>, (Sep. 18, 1997),3 pages.
Webopedia, "Definition of Network", Retrieved from: <http://wvwv.webopedia.com/TERM/n/network.html>,(Sep. 1, 1996),2 pages.
Hall, Richard S., "Agent-based Software Configuration and Development", http://vvvvw.doc.ic.ac.uk/~alw/edu/theses/hall-phd-0599.pdf on Jun. 8, 2009, Thesis of the University of Colorado,(May 1, 1999),182 pages.
Acklen, et al., "Using Corel Wordperfect 9", Que Corporation,,(1998),pp. 251-284, 424-434, 583-585.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 2, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Office Action", U.S. Appl. No. 11/170,521, (Jan. 21, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
"Notice of Allowance", U.S. Appl. No. 10/988,718, (Apr. 9, 2009),17 pages.
"Final Office Action", U.S. Appl. No. 11/107,347, (Apr. 2, 2009),15 pages.
"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, (Apr. 2, 2009),19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 4, 2009),24 pages.
"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 4, 2009),14 pages.
"HP Blade Server BH Series Operating System Guide", Hewlett-Packard,(Jul. 2002).
"Non Final Office Action", U.S. Appl. No. 09/599,809, (May 13, 2009),25 pages.
"Non Final Office Action", U.S. Appl. No. 11/295,178, (May 27, 2009),111 pages.
"Non Final Office Action", U.S. Appl. No. 10/990,152, (May 28, 2009),19 pages.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.
"Foreign Office Action", Application Serial No. 2002-503702, Final Notice of Rejection,(Jun. 5, 2009),212 pages.
Kaori, Iwantani et al., "Perfect Manual of Clarisworks 4.0 for Macintosh", 1st Edition, Japan,(Jul. 22, 1997),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative- Looking but 'Attentive' New Function", NIKKEI PC 21, vol. 4, No. 8,(Aug. 1, 1999),pp. 115-116.
Yasuji, Fukuhara "Clarisworks, Introduction to Business Document Construction, No. 4, Estimate", NIKKEI MAC, No. 14,(May 17, 1994),pp. 197-204.
"Final Office Action", U.S. Appl. No. 10/976,451 (Jul. 2, 2009), 22 pages.
Reagan, Moore W., et al., "Collection-based persistent digital archives", U.S. Appl. No. 60/191,662 as filed Mar. 23, 2000, 133.
"Non-Final Office Action", U.S. Appl. No. 11/170,521, (Dec. 17, 2009), 11 pages.
"Notice of Allowance", U.S. Appl. No. 10/990,152, (Dec. 21, 2009), 6 pages.
Honkala, Mikko et al., "Multimodal Interaction with XForms", ICWE '06, (2006), pp. 201-208.
"Final Office Action", U.S. Appl. No. 11/295,178, (Dec. 24, 2009), 38 pages.
"Non-Final Office Action", U.S. Appl. No. 10/402,640, (Dec. 30, 2009), 16 pages.
"Non-Final Office Action", U.S. Appl. No. 12/021,894, (Dec. 31, 2009), 10 pages.
"Non-Final Office Action", U.S. Appl. No. 11/218,149, (Jan. 14, 2010), 15 Pages.
"Notice of Allowance", U.S. Appl. No. 10/955,665, (Dec. 30, 2009), 2 pages.
"Final Office Action", U.S. Appl. No. 11/227,550, (Jan. 19, 2010), 12 pages.
"Final Office Action", U.S. Appl. No. 11/234 767, Jan. 26, 2010 , (Jan. 26, 2010), 23 pages.
"Foreign Office Action", Application Serial No. 200610051544.X (Dec. 4, 2009) , 9 pages.
"Notice of Allowance", U.S. Appl. No. 11/872,703, (Jan. 27, 2010), 19 pages.
"Final Office Action", U.S. Appl. No. 10/916,692, Nov. 16, 2009, 10 pages.
"Final Office Action", U.S. Appl. No. 11/218,149, Nov. 16, 2009, 18 pages.
"Foreign Office Action", Mexican Patent Application No. PA/a/2006/002493 Sep. 14, 2009, 5 pages.
"Non-Final Office Action", U.S. Appl. No. 11/036 910, Nov. 13, 2009, 9 pages.
"Notice of Allowance", U.S. Appl. No. 10/955,665, Nov. 3, 2009, 8 pages.
"Notice of Allowance", U.S. Appl. No. 11/095,254, Nov. 18, 2009, 8 pages.
"Notice of Allowance", U.S. Appl. No. 10/942,528, Dec. 3, 2009, 8 pages.
Van Hoff, Arthur et al., "The Open Software Description Format", Retrieved from: <www.w3.org/TR/NOTE-OSD> on May 18, 2009 Aug. 13, 1997, 10 pages.
"Notice of Allowance", U.S. Appl. No. 11/056,500, (Dec. 2, 2009),17 pages.
"Final Office Action", U.S. Appl. No. 11/557,931, (Feb. 26, 2010),8 pages.
"Supplemental Notice of Allowance", U.S. Appl. No. 10/955,665, (Mar. 5, 2010), 2 pages.

"Notice of Allowance", U.S. Appl. No. 110/93,588, (Mar. 10, 2010),10 pages.

"Non-Final Office Action", U.S. Appl. No. 11/227,550, (Mar. 10, 2010),12 pages.

"Notice of Allowance", U.S. Appl. No. 11/044,106, (Mar. 15, 2010),7 pages.

"Final Office Action", U.S. Appl. No. 11/107,347, (Mar. 22, 2010),11 pages.

* cited by examiner

Rendered View of Existing Electronic Form Template

TIRE SALES RECORD

*Acme Tire Company*
*A Family-Owned Company*

| Salesman Name: |
|---|
| Employee No.: |

| Type of Tire: |
|---|
| Tire Cost: |
| Total Price: |

Customer Information

| Car Type: | |
|---|---|
| Customer Name: | |
| Street: | |
| City: | |
| State: | ZIP Code: |

Fig. 4

DESIGNER-CREATED ASPECT FOR AN ELECTRONIC FORM TEMPLATE

TECHNICAL FIELD

This invention relates to electronic form templates.

BACKGROUND

Electronic forms are commonly used to collect information. These electronic forms may enable users to enter data and have that data stored digitally, such as in computer-accessible databases. Data so stored can be quickly retrieved, allowing others to use that data.

Electronic form templates may be designed to collect specific kinds of information or to collect it in particular ways. An electronic form template for recording tire sales, for instance, may be designed to enable entry of a tire salesman's name and employee number, the type of tire sold, the cost of the tires, and customer information. With this recorded information, the tire company may better be able to keep track of its sales, inventory, and customer information.

For consistency across multiple forms or to save time and effort, a programmer may wish to reuse part of an electronic form template when building another electronic form template. A programmer may, for example, want to reuse the part of the tire sales record for recording a customer's information in another electronic form template needing entry of such information. To do so, however, the programmer may have to write code, often requiring substantial time or programming experience.

SUMMARY

Systems and/or methods ("tools") are described that enable addition of a designer-created aspect originating from one electronic form template into another electronic form template.

In one embodiment, the tools enable—without programming—a user to package designer-created aspects of an existing electronic form template into a component capable of being added to another electronic form template.

In another embodiment, the tools enable mapping of a non-structural designer-created aspect onto a data structure of an electronic form template.

BRIEF DESCRIPTION OF THE DRAWINGS

FIG. 4 illustrates the view of FIG. 2 with a selection box.

The same numbers are used throughout the disclosure and figures to reference like components and features.

DETAILED DESCRIPTION

Overview

The following disclosure describes a user-friendly way to build into a current electronic form template aspects that previously have been created, such as those originating from an existing electronic form template. A previously created aspect may be built into a current electronic form template without requiring that a form designer have programming experience.

In one embodiment, a user may, without programming, package designer-created aspects of an existing electronic form template into a component that is capable of later being built into another electronic form template. These aspects may comprise various customizations made to the existing electronic form template, such as a structural aspect and non-structural aspects like data connections, business logic (e.g., validation and rules governing data), editing behavior, formatting, and view representations.

Aspects added to a current electronic form template may be non-structural and mapped to an existing data structure of the current electronic form template. This permits, for example, addition of previously existing, designer-created non-structural aspects to an electronic form template having a data structure that may not be changed.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
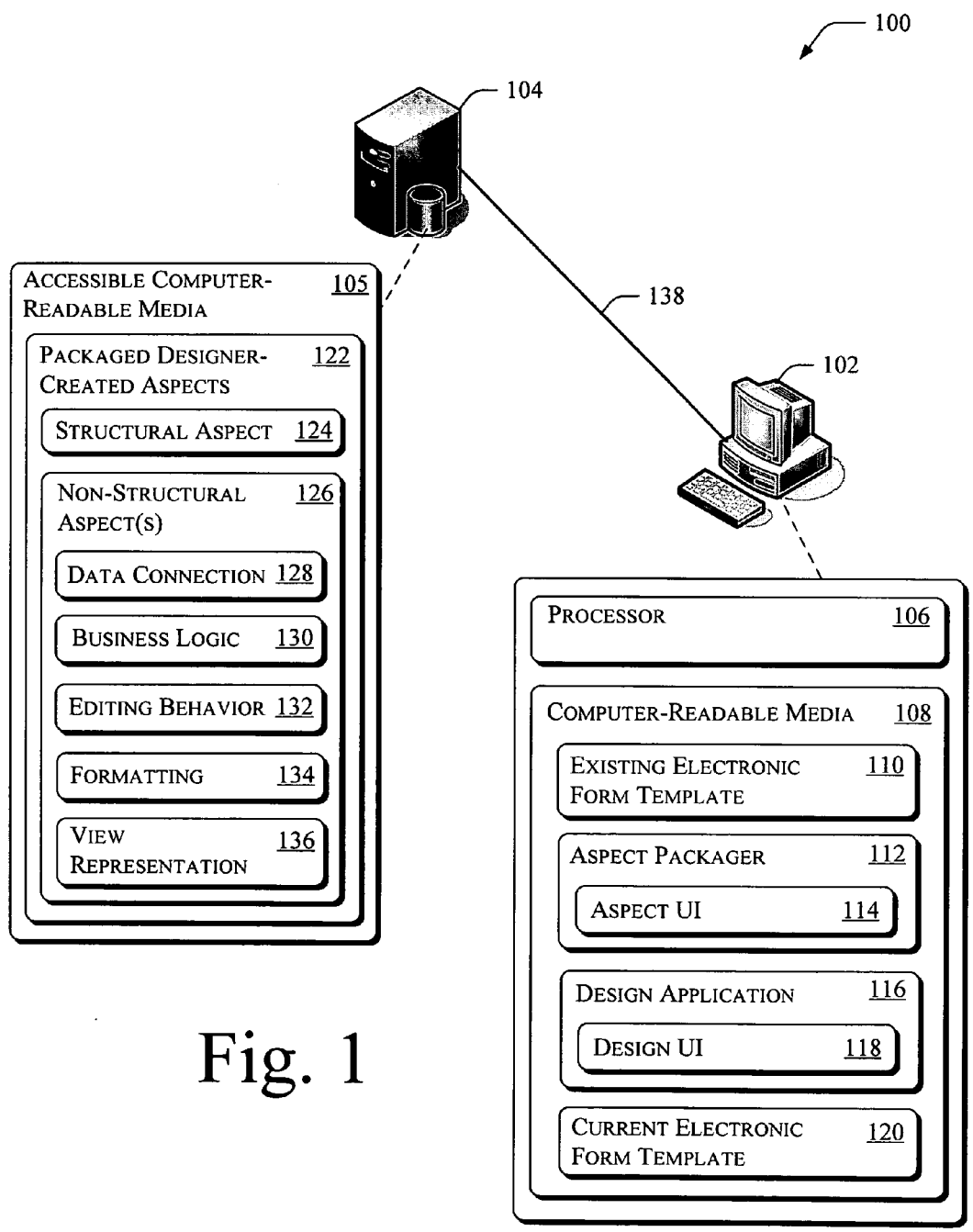
FIG. 1 illustrates an exemplary operating environment.

FIG. 1 illustrates one such operating environment generally at 100 comprising a computer 102 and an accessible data source 104 having accessible computer-readable media 105. The computer is shown comprising a processor 106 and computer-readable media 108. The processor is capable of accessing and/or executing the computer-readable media. The computer-readable media comprises an existing electronic form template 110, an aspect packager 112 having an aspect user interface 114, a design application 116 having a design user interface 118, and a current electronic form template 120. The aspect packager and the design application are shown separate but may be combined.

The aspect packager is capable of enabling a user to package one or more existing designer-created aspects (shown packaged at 122) for later addition to another electronic form template, such as current electronic form template 120. Packaged designer-created aspects 122 comprise a structural aspect 124 and non-structural aspects 126. The non-structural aspects may comprise various customizations made to a form template, like a data connection aspect 128, a business logic aspect 130, an editing behavior aspect 132, a formatting aspect 134, and a view representation aspect 136.

The design application is capable of enabling addition of the packaged designer-created aspects to the current electronic form template. These packaged designer-created aspects are accessible by the computer, such as by being stored on the computer's memory or across a network 138 at the accessible data source 104 (as shown).

An Exemplary Existing Electronic Form Template

An exemplary existing electronic form template is described below. This example form template is provided to aid the reader in understanding various designer-created aspects of electronic form templates that may be packaged for later reuse.

Figure 2:
FIG. 2 illustrates an exemplary rendered view of an existing electronic form template.

A rendered view 200 of existing electronic form template 110 is shown in FIG. 2. The view shows an electronic form template for entering a sale of tires with data-entry fields for a tire salesman's name 202, an employee number 204, a type of tire 206, a tire cost 208, a total price 210, a car type 212, a customer name 214, a customer street 216, a customer city 218, a customer State 220, and a customer ZIP code 222.

These data-entry fields and their arrangement represent an existing, designer-created structural aspect for the existing electronic form template. The data-entry fields also may have different properties that affect their structure, such as by being repeatable (e.g., the type of tire sold and tire cost, like if the customer purchased one type of his front axel and another for his rear axel), optional (e.g., the tire salesman's name, like if his employee number indicates his name and so entering his name is redundant), only permitting entry of text (e.g., the customer's name data-entry field), or only permitting entry of numbers (e.g., the tire cost, total price, and ZIP code fields). The designer of this illustrated existing electronic form template customized it by selecting these particular types of data-entry fields, where they are arranged in the view, and where they reside within the existing electronic form template's data structure.

The existing electronic form template has other (non-structural) aspects created by its designer. Some of these are visual, and so are easy to see in this rendered view. One such aspect comprises formatting. The formatting may determine the font, size, and color of the text in and around the data-entry fields, such as the text "TIRE SALES RECORD", "Acme Tire Company", "A Family-Owned Company", "Salesman Name:", "Employee No.:". "Type of Tire:", "Tire Cost:", "Total Price: ", "Customer Information", "Car Type:", "Customer Name:", "Street:", "City:", "State:", and "ZIP Code:". Another visual aspect is the view representation. This aspect may determine the color and size of the data-entry fields. Data-entry fields 212, 214, 216, 218, 220, 222, and the text "Customer Information", for instance, are within a shaded, dashed-line box marked at 224. This shaded, dashed-line box is one view representation aspect of the existing electronic form template.

The existing electronic form template may comprise other non-structural aspects, such as aspects for data connection, business logic, and editing behavior. One data connection aspect auto-populates the city and State fields. If the salesman enters a ZIP code into the customer zip code data-entry field, for instance, the existing electronic form template may connect to a data source and determine, based on this entered ZIP code, a corresponding city and State. With this information, the existing electronic form template may then populate this corresponding city and State into the city and State data-entry fields, thereby saving the salesman time and possibly reducing the chance of error.

Business logic aspects may perform operations on data entered into the fields. If a particular price is entered into tire cost data-entry field 208, for instance, business logic (e.g., script or managed code) may operate to multiply this number by four (assuming four tires were purchased), add appropriate tax, and enter this total price into total price data-entry field 210.

An aspect for editing behavior may govern how a user is permitted to interact with the existing electronic form template, such as by not permitting a salesman to enter more than a certain number of characters into the employee number field.

Each of these non-structural aspects may be linked to a structural aspect, in this case to corresponding data structures in the existing electronic form template. In one embodiment, each of these links is separable from its associated structure. This separability is described in greater detail below.

Packaging Aspects for Reuse

The following discussion describes exemplary ways in which the tools enable a user to package aspects for reuse.

Figure 3:
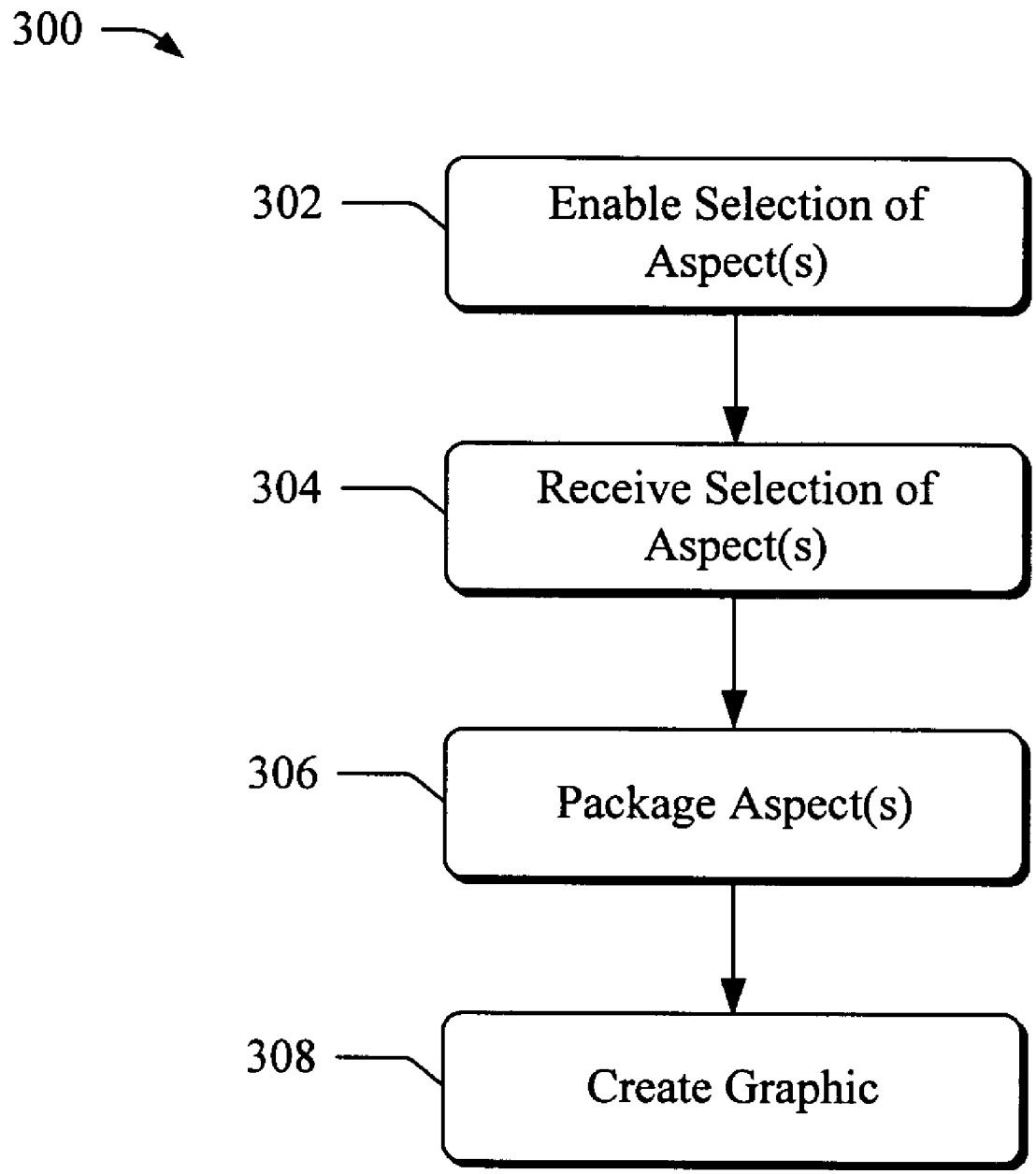
FIG. 3 is a flow diagram of an exemplary process for enabling a designer to package designer-created aspects.

An exemplary process 300 for enabling a user to package aspects, such as those created by a designer and originating from an existing electronic form template, is shown in FIG. 3. Process 300 is illustrated as a series of blocks representing individual operations or acts performed by elements of the operating environment 100 of FIG. 1, such as aspect packager 112 and aspect user interface 114. This and other processes disclosed herein may be implemented in any suitable hardware, software, firmware, or combination thereof; in the case of software and firmware, these processes represent a set of operations implemented as computer-executable instructions stored in computer-readable media 108 and executable by processor 106.

At block 302, the aspect packager enables selection of designer-created aspects. A user is able, for instance, to select an existing designer-created aspect with a text-based command or graphically, such as by graphically selecting a portion of a rendered existing electronic form template representing designer-created aspects.

Continuing the illustrated embodiment, the aspect packager enables selection through the rendered view 200 of the existing electronic form template as shown in FIG. 2. Though this view, the aspect user interface enables a user to select all or particular designer-created aspects of the existing electronic form template for later reuse.

Assume, for example, that the designer of a form template wishes to reuse aspects of the customer information data-entry fields (fields 212, 214, 216, 218, 220, and 222). The form designer may want to have these aspects available for reuse in other form templates, such as a service record for recording automotive services like fixing a car's brakes.

At block 304, the aspect packager receives the user's selection. As mentioned, this selection can be textual, graphical, and otherwise not require that the user program or write code. The selection may comprise all of the existing designer-created aspects of the existing electronic form template or portions of it.

Continuing the illustrated embodiment, the user selects the customer information data-entry fields by drawing a box around these fields, shown with a selection box 402 of FIG. 4.

At block 306, the aspect packager packages the designer-created aspects selected by the user effective to enable one or more of the aspects to be added to another electronic form template. These aspects may be packaged separately or as a group. In one embodiment, these aspects are combined in one, inseparable group. In other embodiments, this packaging is effective to enable the aspects to be added separately to an electronic form template, such as by enabling non-structural aspects to be mapped to an existing data structure of a current electronic form template that has a structure similar to that of the structural aspect associated with these non-structural aspects.

The aspects may be packaged separately and saved locally or at a remote source, such as the six aspects saved at remote source 104 shown in FIG. 1: structural aspect 124; data connection aspect 128; business logic aspect 130; editing behavior aspect 132; formatting aspect 134; and view representation aspect 136. The aspects may be packaged and saved using a markup language (e.g., eXtensible Markup Language, "XML"), a transformation language (e.g., XML style sheet language transformation), an extensible style sheet language (e.g., eXtensible Stylesheet Language), a schema (e.g., XML schema), or as hypertext machine language (HTML), for example.

The aspect packager may also package aspects into a component, the component comprising the structural aspect separable from the associated non-structural aspects (e.g., those shown comprised in non-structural aspects 126 of FIG. 1). This component may comprise the structural and non-structural aspects packaged effective to enable the non-structural aspects to be added to an electronic form template without having to also add the structural aspect.

Continuing the illustrated embodiment, the aspect packager may package the structural and non-structural aspects of the customer information data-entry fields selected at block 304 with selection box 402 of FIG. 4. In this illustrated embodiment, these aspects are packaged into a component, with the structural and non-structural aspects linked but separable.

This component comprises the structural aspect represented by the structural properties of the customer information fields (212, 214, 216, 218, 220, and 222 of FIG. 2), where they are arranged in the view of the existing electronic form template, and where they reside within the existing electronic form template's data structure.

This component also comprises non-structural aspects of the customer information fields. It comprises a formatting aspect, here the font, size, and color of text in and around the data-entry fields, e.g., "Customer Information", "Car Type:", "Customer Name:", "Street:", "City:", "State:", and "ZIP Code:". The component is also built to comprise the view representation aspect, such as the shaded, dashed-line box marked at 224 in FIG. 2. It also comprises a data connection aspect for auto-populating the city and State fields based on a ZIP code.

At block 308, the aspect packager may create an icon or other graphic to aid in future graphical selection of the packaged aspect(s).

Figure 5:
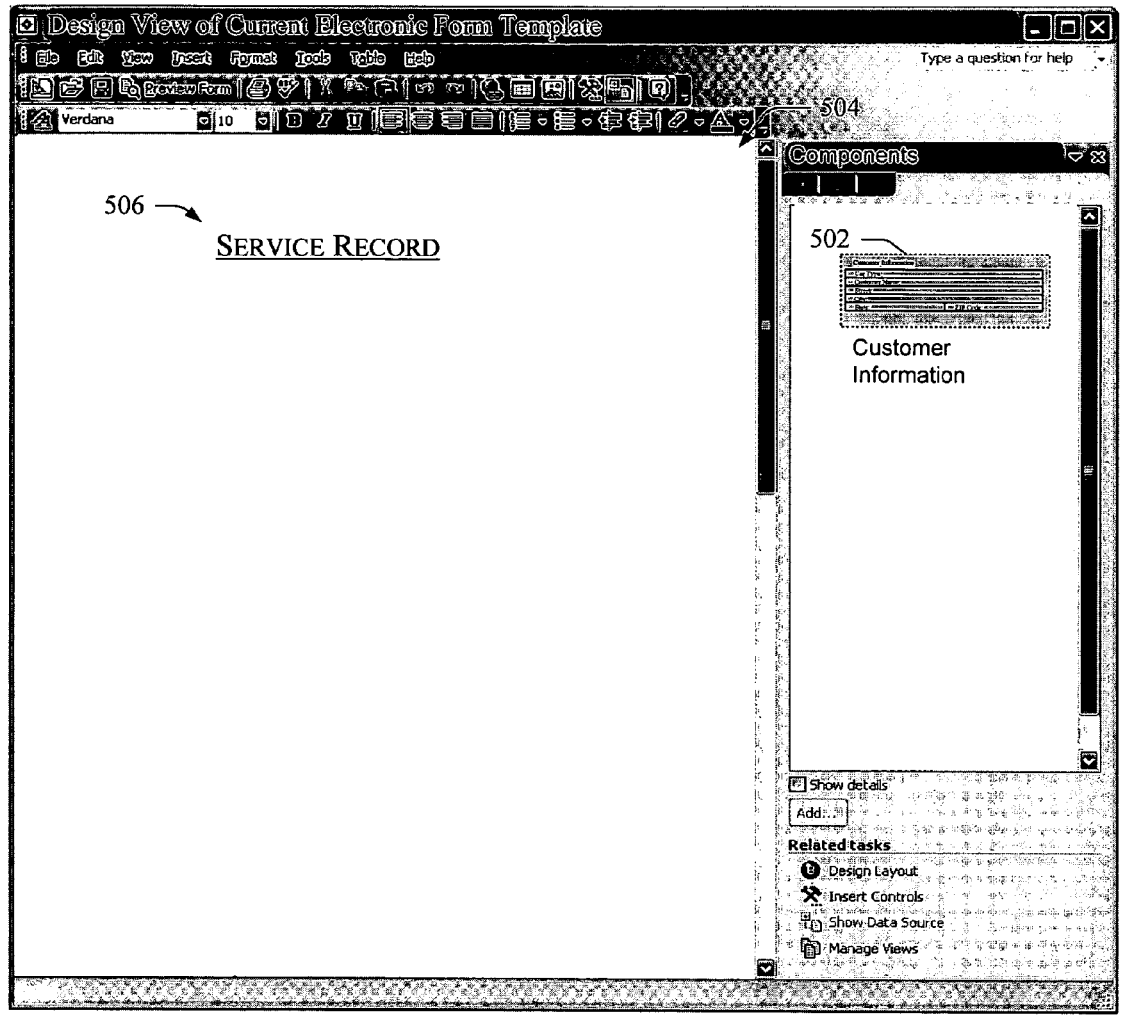
FIG. 5 illustrates a design view of an exemplary current electronic form template.

Continuing the illustrated embodiment, an exemplary view 502 of the component, entitled "customer information", is set forth in FIG. 5. This view of the component comprises an icon representing a smaller, simplified view of the portion of the existing electronic form template from which the component's aspects were packaged. This FIG. 5 also shows a design view 504 of current electronic form template 120, which is in the process of being built. The current electronic form template comprises a non-entry text box showing the title of the current electronic form template, "SERVICE RECORD", at 506.

Following block 306 and/or block 308, computer-readable media 108 of FIG. 1 may proceed (whether through the aspect packager, design application, or otherwise) to perform the acts of process 600 set forth below. In one embodiment it proceeds from process 300 to process 600 automatically, thereby adding the aspects selected in process 300 into current electronic form template 120 without further user or designer interaction.

Adding Designer-Created Aspects

The following discussion describes exemplary ways in which the tools enable an aspect to be added to an electronic form template.

Figure 6:
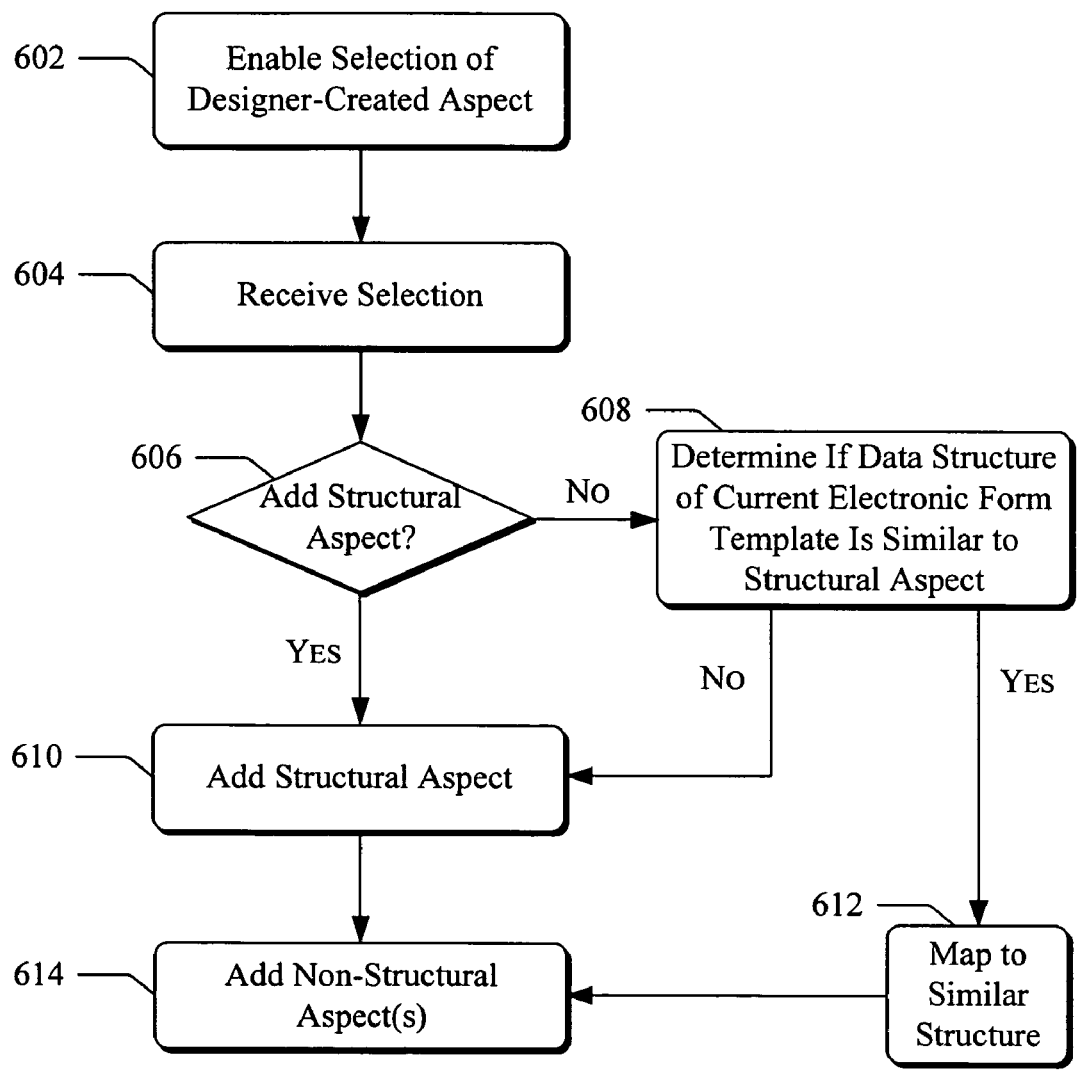
FIG. 6 is a flow diagram of an exemplary process for enabling a designer to add a designer-created aspect to an electronic form template.

An exemplary process 600 for enabling a designer to add a packaged designer-created aspect to an electronic form template is shown in FIG. 6. Process 600 is illustrated as a series of blocks representing individual operations or acts performed by elements of the operating environment 100 of FIG. 1, such as design application 116 and design user interface 118.

At block 602, the design application (and its user interface) enables selection of a packaged designer-created aspect. The design application may do so graphically or otherwise. In one embodiment the design application also enables selection of standard, built-in controls (not shown). In this embodiment, the standard, built-in controls may be selected and used similarly as the packaged, designer-created aspect.

Continuing the illustrated embodiment, the design application presents design view 504 of current electronic form template 120 shown in FIG. 5. The design application enables graphical selection of the packaged designer-created aspects represented by component 502.

At block 604, the design application receives a selection to add a packaged designer-created aspect to the current electronic form template. The design application may enable, and may receive, selection of a group of aspects together or singularly. The design application may receive a selection to add just the structural aspect, the structural aspect and one or more of the non-structural aspects, or any number of the non-structural aspects without the structural aspect.

At block 606, if the designer selects to add the structural aspect or does not indicate whether or not to add the structural aspect, the design application proceeds along the "No" path to block 608. If the designer explicitly selects to add the structural aspect, the design application proceeds along the "Yes" path to block 610.

Continuing the illustrated embodiment, the designer drags the component (see 502 of FIG. 5) into an area occupied by the design view (not shown). In this case, the designer does not indicate whether or not he or she wishes to add the structural aspect. The design application proceeds to block 608.

At block 608, the design application determines whether or not the current electronic form template comprises a data structure similar to that of the structural aspect and/or to which a non-structural aspect may be mapped. If not, the design application proceeds along the "No" path to block 610. If yes, the design application proceeds along the "Yes" path to block 612.

The design application may make this determination using a "sniffer" program capable of analyzing the current electronic form template's structure, such as a schema governing the current electronic form template. If the design application determines that the current electronic form template comprises such a data structure, it may map the non-structural aspect(s) to the similar data structure or ask the designer whether or not to do so and respond accordingly.

Continuing the illustrated embodiment, the design application determines that the current electronic form template being designed in FIG. 5 does not comprise a similar structure to that of the structural aspect. The design application then proceeds to block 610.

At block 610, the design application adds the structural aspect to the current electronic form template. In one embodiment, the design application alters the data structure of the current electronic form template to incorporate the structural aspect. It may do so by altering, for instance, a schema governing the current electronic form template.

Following or incident with this addition, the design application adds the selected non-structural aspects to the current electronic form template at block 614. In one embodiment, the design application adds the selected non-structural aspects by mapping these non-structural aspects to the added structural aspect and saving the non-structural aspects to files associated with the current electronic form template.

Figure 7:
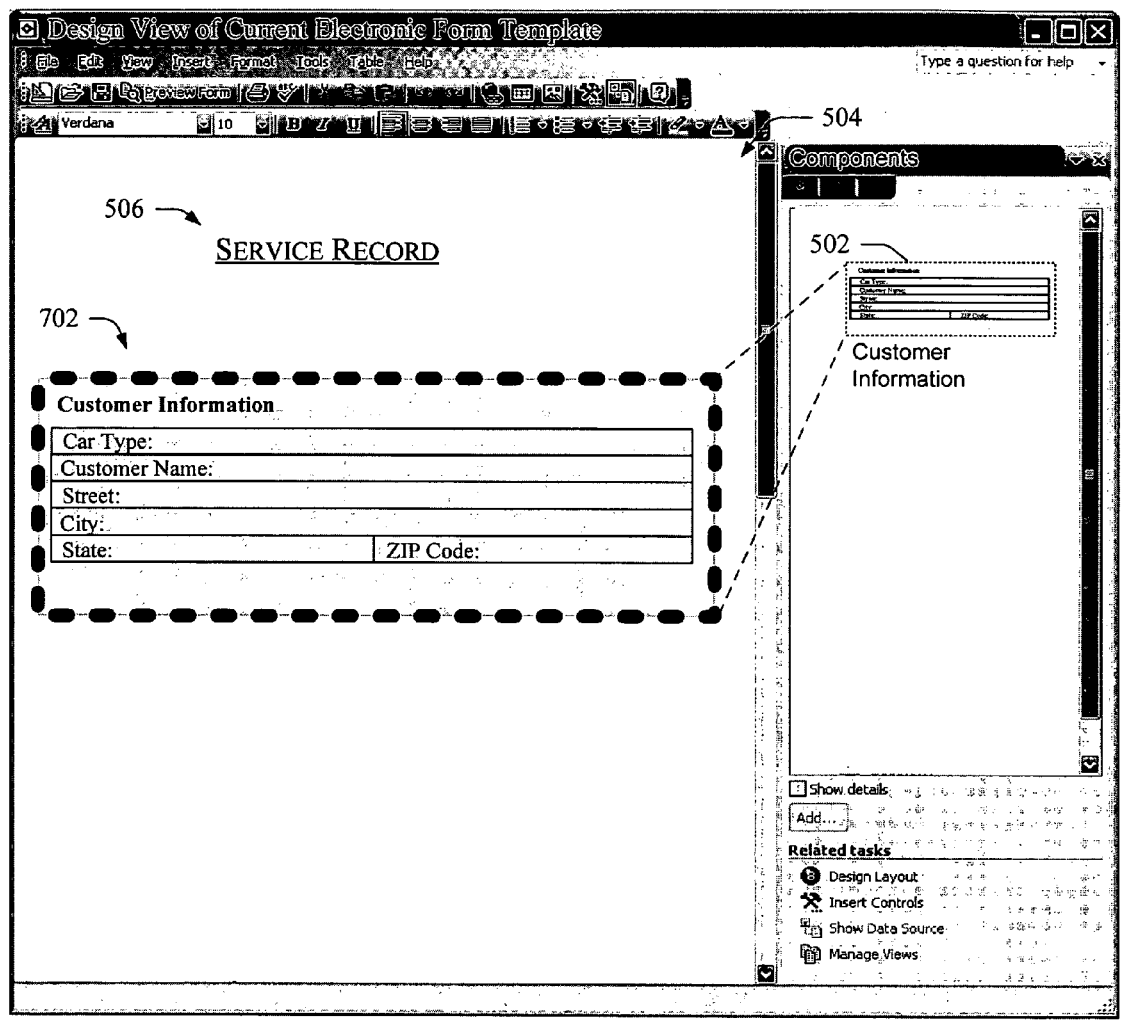
FIG. 7 illustrates the view of FIG. 5 with addition of exemplary, packaged designer-created aspects.

FIG. 7 shows this addition of the packaged designer-created aspects of the component to the current electronic form template at 702.

Returning to block 608, the design application may determine that the current electronic form template comprises a data structure similar to that of the structural aspect and/or to which a non-structural aspect may be mapped.

Figure 8:
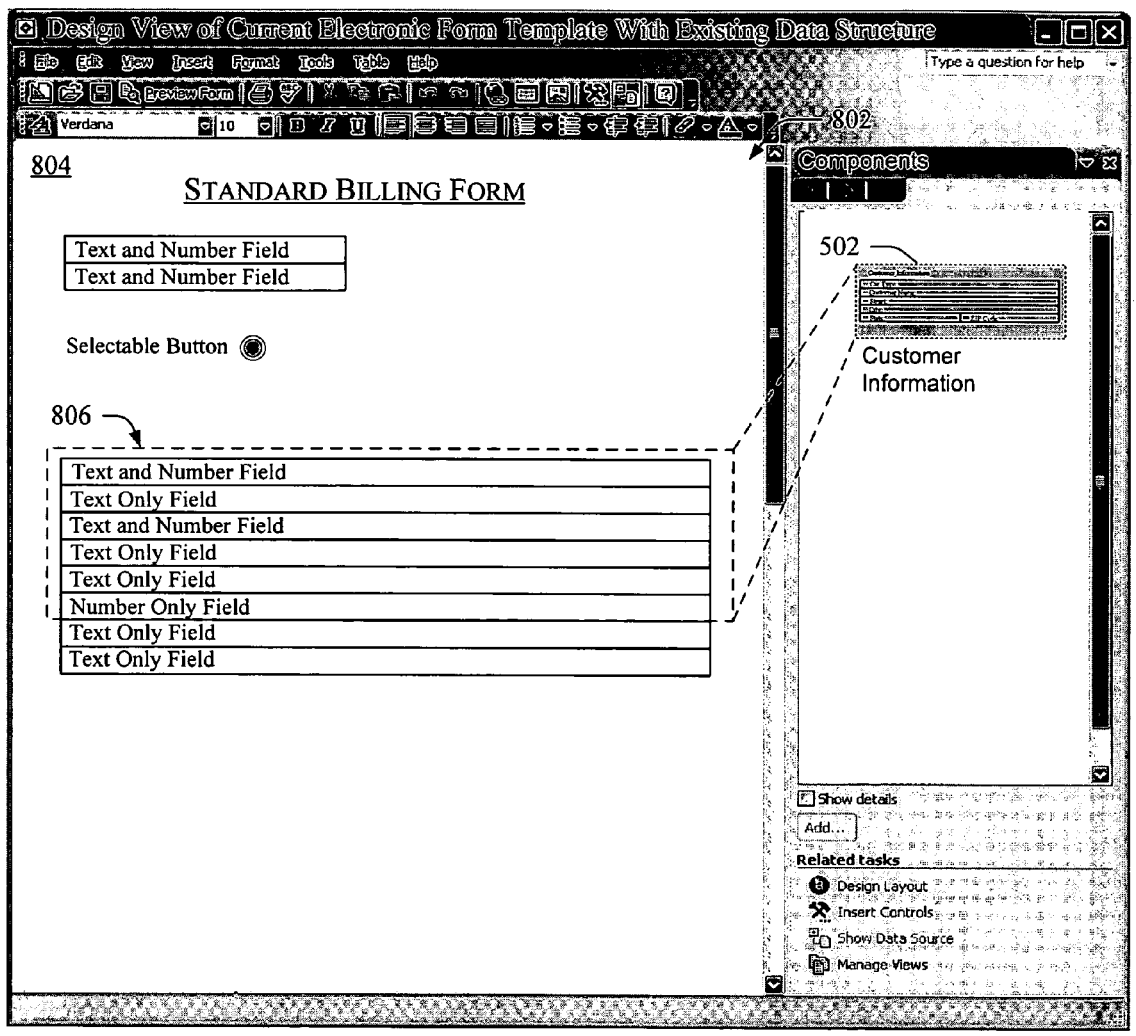
FIG. 8 illustrates a design view of an exemplary current electronic form template having an existing data structure.

By way of example, FIG. 8 sets forth a second illustrated embodiment showing a design view 802 of a current electronic form template 804 having an existing data structure. This current electronic form template is a standard form template designed for billing clients. Because the form template matches a standard (whether set by an industry, billing software company, or others), a form designer may not wish to alter its data structure, as that may make the form template's intended use difficult or impossible. This form template comprises various controls, like data-entry fields and a selectable button.

At block 608, the design application determines that a set 806 of the data-entry fields (shown within a dashed-line box) has a data structure similar to that of the structural aspect of the customer information component shown in FIG. 8 at 502. This set may be governed by a schema similar to that of the structural aspect of the customer information component, for instance. This set may be similar in part due to its properties matching those of the customer information fields of FIG. 2. The set of fields 806 comprise, similar to the customer information fields of FIG. 2, six data-entry fields where two of them permit text or numbers, three permit only text, and one permits only numbers.

Responsive to this determination, the design application proceeds to block 612. At block 612, the design application maps selected non-structural aspects to a data structure of the current electronic form template. This data structure is similar to that of the structural aspect associated with the non-structural aspects and/or has a structure permitting mapping of the non-structural aspects. Through this mapping, the design application may enable a designer to add previously existing designer-created aspects to a current electronic form template that already has a data structure.

Continuing this illustrated embodiment, and assuming that the form designer selected all of the customer information component's non-structural aspects, the design application maps each of the non-structural aspects to the similar data structure of the current electronic form template of FIG. 8.

The customer information component comprises, by way of review, three non-structural aspects shown in FIG. 1: data connection aspect 128; formatting aspect 134; and view representation aspect 136. The design application maps each 11 of these to the similar data structure of the current electronic form template and adds them to the current electronic form template at block 614.

Figure 9:
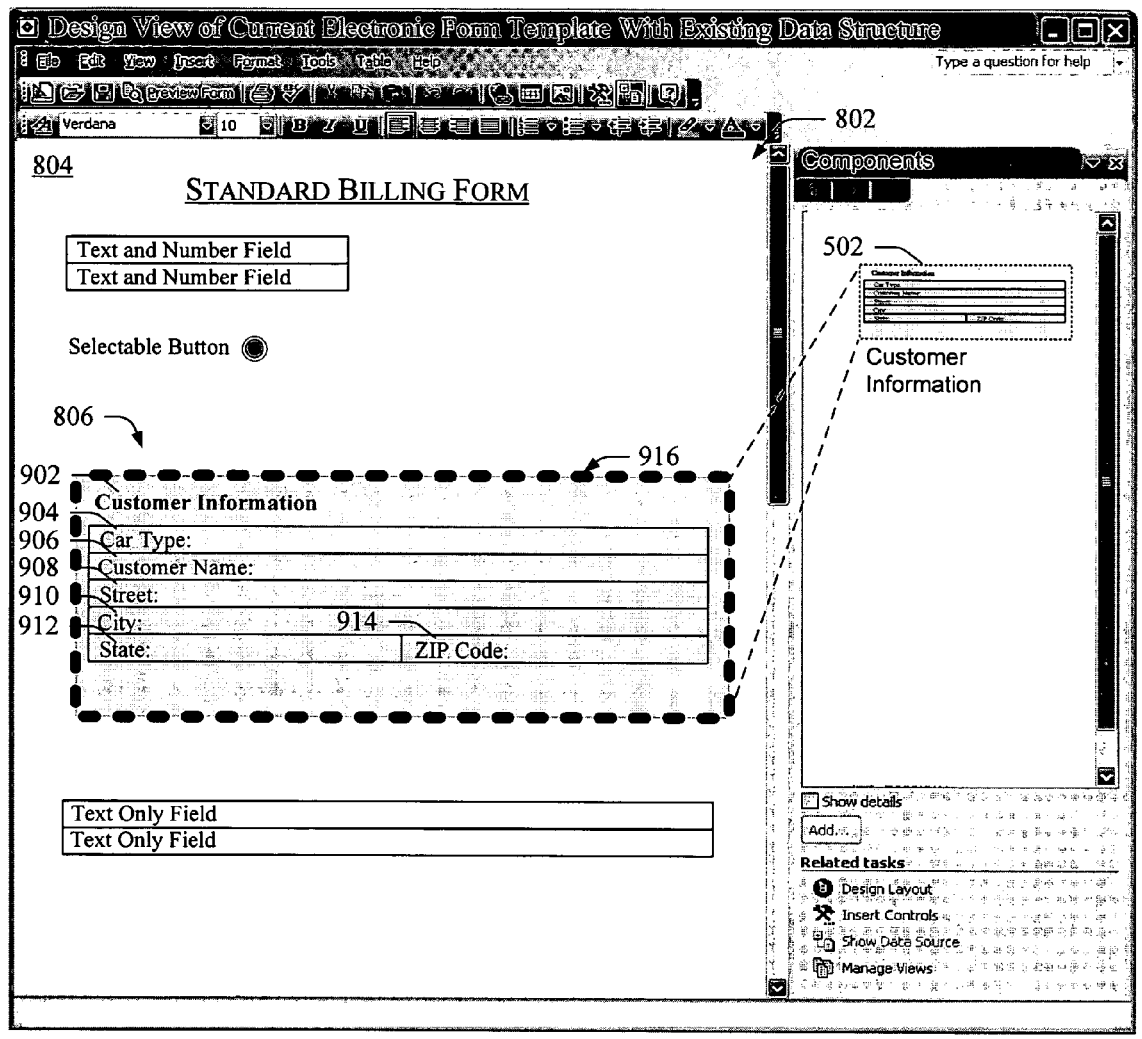
FIG. 9 illustrates the view of FIG. 8 with addition of exemplary non-structural aspects.

This addition of the non-structural aspects is shown in part with FIG. 9. This figure presents a design-view representation of the additional formatting and view representation aspects. The data connection aspect for auto-populating the State and city fields is not shown. The formatting is shown with the addition of text having the font, size, and color also shown in FIG. 2 with "Customer Information" at 902, "Car Type:" at 904, "Customer Name:" and 906, "Street:" at 908, "City:" at 910, "State:" at 912, and "ZIP Code:" at 914. The view representation is shown with the shaded, dashed-line box marked at 916.

The structural or non-structural aspects enabled to be added to the current electronic form template, whether the form template has a similar data structure to that of a packaged designer-created aspect or not, may be added with information sufficient to permit the aspects to be viewed differently in a design view than a user view. Also, this information may enable an added designer-created aspect to be altered through the design view.

CONCLUSION

The above-described tools enable packaging and/or reuse of aspects for electronic form templates. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A method comprising:
enabling graphical selection, via a graphical interface, of aspects originating from a first electronic form template, the first electronic form template existing prior to the graphical selection;
receiving selection, via the graphical interface, of one or more of the aspects from the first electronic form template, at least one of the one or more selected aspects comprising a structural aspect linked to a non-structural aspect, the structural aspect comprising an arrangement of one or more visual elements of the first electronic form template and the non-structural aspect comprising one or more data behaviors of data associated with the structural aspect, the non-structural aspect being configured to be separable from the structural aspect such that the non-structural aspect is able to be added to a second electronic form template separately from its linked structural aspect without requiring the linked structural aspect also be added; and
adding, responsive to the selection, the one or more selected aspects to the second electronic form template via the graphical interface by graphically transferring, from a rendered view of the one or more selected aspects, the one or more selected aspects to the second electronic form template, the second electronic form template being distinct from the first electronic form template.

2. The method of claim 1, wherein the act of receiving selection comprises receiving selection of less than all of the aspects enabled to be graphically selected.

3. The method of claim 2, wherein the act of adding comprises adding only the one or more selected aspects.

4. The method of claim 1, wherein the act of enabling comprises enabling selection of one or more non-structural aspects.

5. The method of claim 4, further comprising mapping the non-structural aspect to an existing data structure of the second electronic form template if the existing data structure is similar to a structural aspect originating from the first electronic form template and associated with the non-structural aspect.

6. The method of claim 1, wherein: the act of enabling comprises enabling graphical selection of an aspect that determines formatting of a part of the first electronic form template; the act of receiving comprises receiving selection of this formatting aspect; and the act of adding comprises adding this formatting aspect to the second electronic form template effective to alter formatting of the second electronic form template.

7. The method of claim 1, wherein: the act of enabling comprises enabling graphical selection of an aspect comprising a data structure that governs at least part of the first electronic form template; the act of receiving comprises receiving selection of this data structure aspect; and the act of adding comprises adding the data structure to the second electronic form template.

8. A method comprising:
enabling graphical selection, via a graphical interface, of one or more designer-created aspects of a first electronic form template, the first electronic form template existing prior to the graphical selection;
receiving selection, via the graphical interface, of the designer-created aspect(s) of the first electronic form template; and
packaging the selected designer-created aspect(s) effective to enable packaged aspect(s) to be added, via the graphical interface, to a second electronic form template that is distinct from the first electronic form template by graphically transferring, from a rendered view of the packaged aspect(s), the packaged aspect(s) to the second electronic form template, at least one of the selected designer-created aspect(s) comprising a structural aspect linked to a non-structural aspect, the structural aspect comprising an arrangement of one or more visual elements of the first electronic form template and the non-structural aspect comprising one or more data behaviors of data associated with the structural aspect, the packaging being effective to enable the non-structural aspect to be added to the second electronic form template without requiring that the linked structural aspect also be added to the second electronic form template.

9. The method of claim 8, wherein the act of enabling comprises enabling selection through a rendered view of the first electronic form template.

10. The method of claim 8, wherein the act of enabling comprises enabling selection of all designer-created aspects of the first electronic form template and the act of receiving selection comprises receiving selection of all of the designer-created aspects of the first electronic form template.

11. The method of claim 8, wherein the act of packaging comprises packaging and saving the selected designer-created aspect(s) using an extensible markup language.

12. A method comprising:
enabling graphical selection, via a graphical interface, of a non-structural aspect of a first electronic form template, the first electronic form template existing prior to selection, the non-structural aspect being created by a designer and comprising one or more data manipulation behaviors that can be applied to data of the first electronic form template;
receiving selection, via the graphical interface, of the non-structural aspect without requiring a linked structural aspect to also be received; and
mapping the selected non-structural aspect to an existing data structure of an existing second electronic form template effective to add, via the graphical interface, the selected non-structural aspect to the second electronic form template by graphically transferring, from a rendered view of the selected non-structural aspect, the selected non-structural aspect to the second electronic form template, the existing second electronic form template being distinct from the first electronic form template.

13. The method of claim 12, further comprising determining if the data structure of the second electronic form template is one to which the selected non-structural aspect is capable of being mapped.

14. One or more computer-readable media having computer-readable instructions therein that, when executed by a computer, cause the computer to perform acts comprising:
enabling graphical selection, via a graphical interface, of one or more designer-created aspects of a first electronic form template, the electronic form template existing prior to the graphical selection;
receiving selection, via the graphical interface, of the one or more designer-created aspects of the first electronic form template, the one or more selected designer-created aspects comprising at least one structural aspect separably linked to a non-structural aspect, the structural aspect comprising an arrangement of one or more visual elements of the first electronic form template and the non-structural aspect comprising one or more rules governing data associated with the structural aspect of the first electronic form template, the non-structural aspect being configured to be added to a second electronic form template separately from the structural aspect without requiring the structural aspect also be added, the second electronic form template being separate from the first electronic form template;
packaging the one or more selected designer-created aspects for reuse; and
adding, via the graphical interface, the one or more packaged aspects to the second electronic form template by graphically transferring, from a rendered view of the one or more packaged aspects, the one or more packaged aspects to the second electronic form template.

15. The computer-readable media of claim 14, wherein the instructions cause the computer to perform the act of adding to comprise mapping the non-structural aspect to a data structure of the second electronic form template.

16. The computer-readable media of claim 14, wherein the instructions further cause the computer to perform acts comprising determining if the data structure of the second electronic form template is similar to the structural aspect of the first electronic form template that is separably linked to the non-structural aspect.

17. The computer-readable media of claim 14, wherein the instructions further cause the computer to perform acts comprising:
receiving selection of the one or more packaged aspects, wherein the act of adding the one or more packaged aspects is responsive to the act of receiving selection of the one or more packaged aspects.

* * * * *